United States Patent [19]

Jacques

[11] Patent Number: 4,770,519
[45] Date of Patent: Sep. 13, 1988

[54] DRINKING CUP ADAPTABLE INTO BINOCULARS

[76] Inventor: James S. Jacques, 5025 N. First Ave., Tucson, Ariz. 85718

[21] Appl. No.: 121,785

[22] Filed: Nov. 16, 1987

[51] Int. Cl.⁴ .................. G02B 23/18; G02B 23/20
[52] U.S. Cl. .................................... 350/556; 350/243; 350/546
[58] Field of Search ............... 350/140, 145, 243, 250, 350/546, 548, 556; 206/216-217

[56] References Cited

U.S. PATENT DOCUMENTS

| 3,009,567 | 11/1961 | Erickson | 350/243 |
| 3,397,935 | 8/1968 | Natsume | 350/243 |
| 4,268,111 | 5/1981 | Green | 350/145 |

FOREIGN PATENT DOCUMENTS

824873 12/1959 United Kingdom ............... 350/140

*Primary Examiner*—William H. Punter
*Attorney, Agent, or Firm*—J. Michael McClanahan

[57] ABSTRACT

A novel drinking cup adaptable into binoculars consisting of a stackable, truncated conical frustum shaped drinking cup having a pair of spaced apart ocular lenses on one slanted side and a pair of objective lenses situated on the opposite slanted side, with oppositely located crease folds on the cup slanted sides opposite each other and midway between the ocular and objective lens. In addition, a pair of diverging creases are placed in the cup slanted side on opposite sides of one of the lengthwise crease line, the pair of diverging crease lines such that they diverge from a common meeting point at the end of the cup having the smallest diameter to the end of the cup having the largest diameter. After use as a drinking cup, the two crease lines on opposite sides of the cup are folded to result in the cup cross-section taking on the appearance of a cylinder having an elliptical cross-section, and then the two crease lines on opposite sides of one of the oppositely located crease lines are again folded to result in an elliptical or oval shaped straight tube having equal distance between each pair of ocular lens and objective lens. The binocular is focused by holding between the thumb and a finger and pressing the resulting ellipse to vary the distance between the ocular and the objective lenses.

12 Claims, 1 Drawing Sheet

DRINKING CUP ADAPTABLE INTO BINOCULARS

BACKGROUND OF THE INVENTION

1. Field of the Invention

The field of the invention is novel low cost binoculars.

2. Description of the Related Art

Novel binoculars which may be produced inexpensively and sold at low cost are common concession items at sporting events or other spectator events where the action takes place at some distance from the fans. For example, a low cost binocular would be quite useful at baseball, football, hockey, and to some extent, basketball games where the spectator is interested in following the movement of the ball and of the players in close detail.

Foldable binoculars of the above description are known and available, for example, Green in U.S. Pat. No. 4,268,111 discloses a low-cost folding binocular which may be collapsed to a relatively thin package. This novel binocular is constructed of a laminated synthetic plastic or pressed paper with the objective and eye piece lenses on opposite sides of a box-like construction. Focus adjustment is effected by longitudinal folding of the case along creased fold lines which permit the distance between the objective and the ocular or eye piece lenses to be changed.

Other novel binoculars are known, for example, Natsume in U.S. Pat. No. 3,397,935 constructs a binocular from a cup wherein the objective lens are located at one circular end of the cup and the ocular or eye piece len are located at the opposite circular end of the cup.

Lastly, another novel binocular is constructed much like the binocular of Natsume where in Erickson, U.S. Pat. No. 3,009,567, two telescoping slidable boxes have the objective lens at one end and the ocular lens at the opposite end and focus is achieved by sliding one of the boxes relative to the other.

With the exception of the device shown by Natsume, all of the prior art above known to the inventor are single purpose novel binocular which is of special construction and which is not conducive as a promotion to be given away by what might be the most logical vendor at a sports event, namely a beverage vendor of soft drinks or light alcoholic beverages such as beer.

While the cup of Natsume would function as a promotional advertising and goodwill advertisement of a beverage bottler, yet the cup formed is not readily stackable because it does not have conical sides and therefore, not being stackable, the volume occupied by empty cups is so great, use at a sporting event is clearly discouraging. In addition, if the removable top is separated from the cup, the function of the binocular is similarly lost.

Accordingly, it is apparent that if a low cost novel binocular can be constructed in the shape of a conically shaped cup, so as to render the cups stackable and where the cup, after usage holding a beverage, could easily be converted into the binocular, there is great value as a promotional device or sellable item at a sports event or any other place where it is desired to view an object with a pair of binoculars.

SUMMARY OF THE INVENTION

This invention relates to a novel cup which is adaptable into binoculars and which is stackable for storage.

More specifically, the subject invention comprises a pressed paper or plastic cup formed as a truncated conical frustum having a removable bottom closure where, on the longitudinal extending cylindrical sides of the cup are located the two spaced apart ocular or eye piece lenses, and on the opposite side of the cup are located, also in the longitudinal direction, the spaced apart objective lenses. Inasmuch as the cup has slanted sides, the distance between one eye piece lens and its related objective lens is different that the distance between the other ocular or eye piece lens and its related objective lens. Obviously then, each lens focuses at different distances. Accordingly, a series of three crease lines are formed along the cup generally in the longitudinal direction, the three crease lines originating at a single point at the smaller diameter base of the cup with the outside two lines diverging equally from the center crease line as the crease lines rise upward in the cup towards the larger end.

The placement of the outer two crease lines are determined by equating the length of the greater arc between the two crease lines at the largest diameter opening of the cup to the circumference of the cup at the lower smaller diameter end. On the opposite side of the cup is one crease line. Both sets of crease lines are midway between the objective and ocular lens.

The lens placed on opposite slanted sides of the cup are placed interiorly to holes cut in the cup and are in a liquid sealed relationship with the sides of the cup.

To operate the invention, the spectator only need fold the cup along the crease lines, making the fold between the two outside crease lines and the center crease line such that the two outside crease lines come together. The folded material formed between the outer crease lines may then either go·interiorly or exterior of the resultant cylinder. The single crease line opposite the three crease lines is also folded close. Obviously when the crease lines are folded or pinched closed, they will spring open an amount when the finger pressure is released. With the resultant elliptical or oval cylinder now having a constant diameter through its length at opposite longitudinal points, both objective lenses are the same distance from both ocular lenses. The bottom of the cup may be punched out, or may be left in, depending upon the whim of the spectator. If left in, it naturally will be crunched and possibly torn. One advantage of leaving the base in is that it will shield light from the interior of the resulting binocular.

To focus the binocular, the spectator need only to hold the resultant tubular formed binoculars between his thumb and one of his fingers and press down on the elliptical shaped tube to adjust the focus by selectively varying the distance between the objective and ocular lens. It is suggested that the operator grasp both ends of the resulting tubular binocular for adjustment.

In an alternate embodiment of the invention, the bottom of the cup is removed and one or two finger loops are fastened inside the oval shaped tube at the major axis of the elliptical shaped tube.

It is an object of the subject invention to provide novel binoculars which are constructed from a drinking cup.

It is another object of the subject invention to provide novel binoculars constructed from a stackable drinking cup which has conical shaped sides.

It is still a further object of the subject invention to provide novel binoculars which allow focusing by deforming the sides of an ellipse.

Other objects of the invention will in part be obvious and will in part appear hereinafter. The invention accordingly comprises the apparatus comprising the construction, combination of elements, and arrangement of parts which are exemplified in the following detailed disclosure, and the scope of the application which will be indicated.

BRIEF DESCRIPTION OF THE DRAWINGS

For further understanding of the nature and objects of the present invention, reference should be had to the following detailed description taken in conjunction with the accompanying drawings wherein.

In various views, like index numbers refer to like elements.

DETAILED DESCRIPTION OF THE PREFERRED EMBODIMENT

Figure 1:
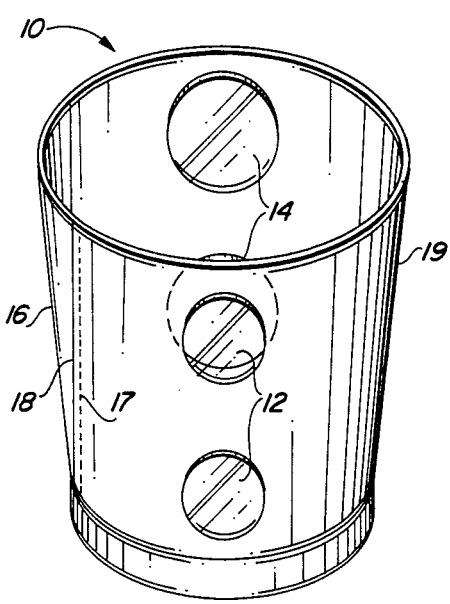
FIG. 1 is a perspective view of the subject invention.
Figure 2:
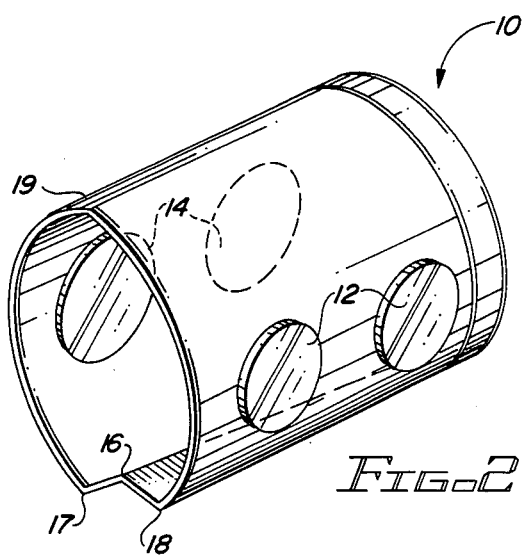
FIG. 2 is a perspective view of the subject invention used as binoculars.

Referring now to FIG. 1, a perspective view of the subject inventive novel drinking cup adaptable into binoculars is detailed. Firstly, cup 10 is pressed paper or plastic charcterized as a truncated conical frustum where one end, nominally the smallest circular end, is normally sealed with a bottom circular seal and the upper larger circular end is open. The cup is also characterized by having four lenses placed into holes formed in the longitudinally extending cylindrical sides as shown in FIG. 1. Two of the lenses, nominally the ocular lens or eye piece lens 12, are on one side of the cup and the other two lenses, objective lenses 14, are on the opposite side of the cup. The lenses are so arranged so that one eye piece lens is directly opposite one objective lens and the other eye piece lens and objective lens have the same relationship. Generally, each set of eye piece lens and objective lens is on a longitudinal line proceeding lengthwise from the center of the top circular opening to the center of the lower circular opening. For a cup sitting upon a horizontal surface, the longitudinal vertical line upon which the lens set will be slightly offset since when the cup is folded, as shown in FIG. 2, to an elongated oval, the objective lens must be opposite the ocular lens.

Nominally, both the eye piece and the objective lens are made from inexpensive clear plastic such as may be molded in an injection molding machine. The lenses are secured in holes cut in the cup and to the sides of the holes in the cup by gluing or other appropriate means. Further, lens may be employed which have an annular flange with a peripheral groove in the flange. The periphery of the holes in the paper cup fit into this groove. Obviously, the method by which the lens are attached to the cup must be a waterproof type of adhesive or the like.

The cup 10 is also characterized by means by which, when the cup is used as binoculars, opposite sides of the cup which contain the eye piece lenses, and the objective lenses, are equi-distant apart, since the distance between the eye piece lens and the objective lens determines the focus of the binocular at a particular object at a fixed distance from the viewer. With the cup in its normal state, the distance between the eye piece lens and the objective lens on the bottom portion of the cup is closer than is the distance between the eye piece lens and the objective lens at the point closest to the cup top or cup opening. In order to compensate and make these two distances the same, means must be taken to reduce the cup to a straight cylinder where the diameter at opposite points is constant from top to bottom. In only that way, could each eye piece lens—distant be adjusted together so that both are in focus simultaneously. Such is accomplished by means of the fold or crease lines 16, 17, 18, and 19.

It is noted that the crease lines 16, 17, and 18, which are formed in the cup during its manufacture by merely indenting or weakening the fiber of the cup along the selected lines, all converge to a point at the lower portion of the cup where the diameter is less and spread out on either side of central longitudinal line 16 as the cup circumference increases. The relationship of the crease lines is such that the circumference of the cup at its lower point, i.e., where it joins with a removable bottom closure which is glued in the cup, is equal to the large arc portion of the circumference at the top between the outside two crease lines. In this manner, when the sides of the cup are folded along the diverging crease lines 17 and 18 so that the crease protrudes inside, the circumference at the top and the bottom of the cup is equal, thus having equal major and minor axis diameters throughout its length, and meaning that the distances between both pair of the eye piece lenses and the objective lenses are equal. By such manner, the binocular can then be focused on a distant object by simultaneous adjustment of the distance between opposite lenses.

Referring now to FIG. 2, a perspective view of the subject invention is shown where the cup has been rolled into a straight cylinder, with constant longitudinal diameters throughout its length, an oval shaped elongated cylinder, by folding along the three adjacent crease lines and the single opposite crease line 19 and bringing the two crease or fold lines 17 and 18 together at the larger opening of the cup.

Shown in FIG. 2 is the cup laying on its side with the eye piece lenses 12 now parallel to the sides of the cup, as well as to an imaginary longitudinal line drawn from the centers of each oval end. Located opposite each eye piece lens is a objective lens 14, objective lens 14 so situated as to be in line with the eye piece lens so that a person may be able to see through both sets of lens simultaneously. In addition, the lines between each eye piece lens and objective lens are also parallel. The cup has been folded along the crease lines 16, 17, and 18 in order to achieve the constant straight cylinder desired.

Figure 3:
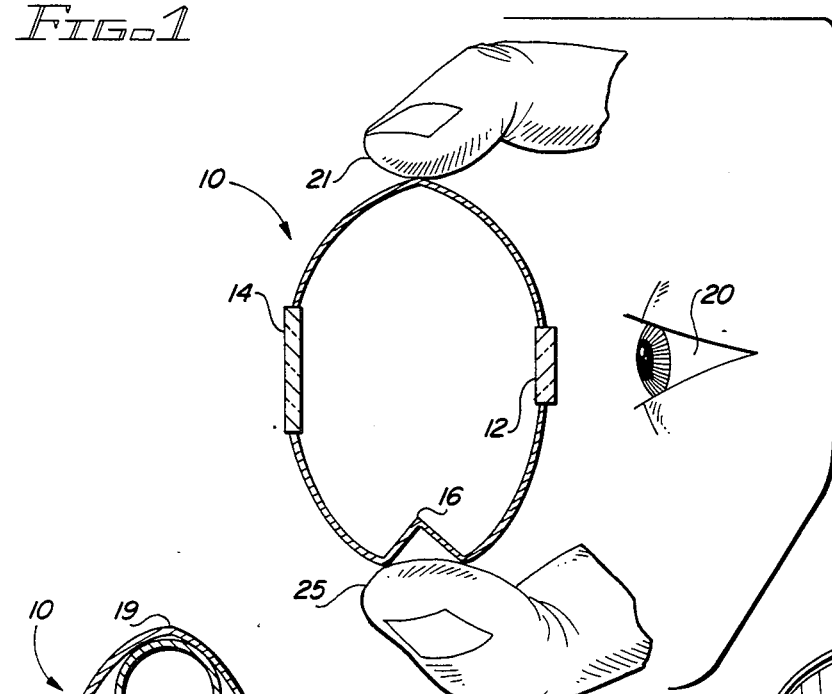
FIG. 3 is an end view of the subject invention used as binoculars.

FIG. 3 shows in an end view the subject invention in use by a person where the cup, after reducing it to a cylinder of constant oval cross-section, is being manipulated by thumb 25 and finger 21 of an operator to focus the objective and eye piece lenses relative to the eye 20 of the operator. The cup has been reduced to a straight cylinder by folding along the crease lines 16, 17, 18, and opposite crease line 19 and now the distance between the objective lens 14 and the eye piece lens 12 is being manipulated for the purpose of focusing upon a distant object as seen by the operator's eye 20. Frictional pressure upon the invention by the lower thumb is sufficient to keep the creases 16, 17, and 18 from separating while the relative thickness or distance between two lenses is expanded or compressed by depressing the cup sides together, or allowing them to come back. In FIGS. 2 and 3, an opening fold is left at the bottom of the cup larger opening is to illustrate the presence of the crease. In operation, the fold or pleat would be brought together so there would be little or no distance between the opposite crease lines.

Now it is noted when the invention is placed in use, it is suggested, although not always necessary, to remove the bottom of the cup which is normally glued in place by punching through it and pulling it out. Of course if the bottom were left in place, the cup could still be made into a straight cylinder so that there were equal distances between each of the eye piece lenses and the objective lenses directly opposite the eye piece lenses, although, it would be difficult to vary the focus since it would be difficult to place the resulting cylinder in the configuration shown in FIG. 3. Obviously, the lower end of the cup would want to be continually round since the bottom glued in place is round. To variably focus the cup with the bottom in place would require deforming the shape of the bottom, resulting in a partial tearing away of the bottom from the sides. Still, shading of the interior would result.

Figure 4:
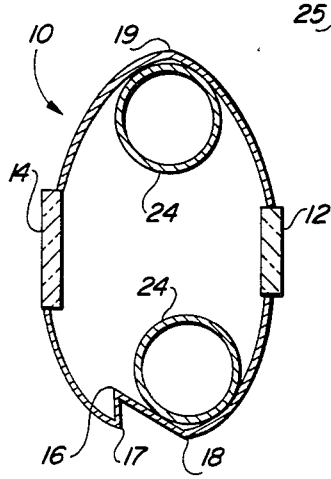
FIG. 4 is an end view of an alternate embodiment of the invention.

Referring to FIG. 4, an alternate embodiment of the novel cup binoculars is shown where two circular finger holes have been glued (or could be attached with clips much like paper clips) at opposite sides in order to manipulate the distance between the objective lenses and the eye piece lenses in order to focus. Shown in FIG. 4 is an end view of the resulting straight cylinder formed by bringing the bottom creases together. Glued at the top and the bottom of both ends of the cylinder are two finger loops 24 adapted to receive two fingers, or if you will, a thumb and finger of each hand. As the distance between the thumb and one of the fingers is brought together or separated, the cylinder horizontal diameter, and thus the distance between the lenses, is also varied. Eye piece lens 12 and objective lens 14 are shown in FIG. 4 in dotted form. It is noted that only one finger loop may also be employed, preferably at the top, and then the focus is adjusted with one finger inside and one finger outside the cylinder.

Figure 5:
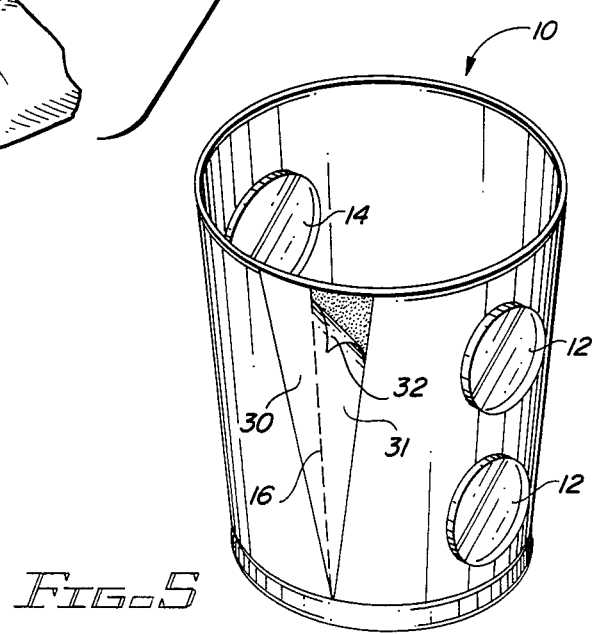
FIG. 5 is a side perspective view of a second alternate embodiment of the invention.

In FIG. 5, a second alternate embodiment of the invention is shown where adhesives have been placed upon the area between the three crease lines in order to better enhance the holding together of the cup material when the cup is being used as a binocular. In FIG. 5, binocular cup 10 is shown in a side perspective view with a protective plastic overlay glued between the outside fold lines on opposite sides of center crease line 16. Shown as Numerals 30 and 31 are the two areas of the cup which will be coated with an adhesive, or if preferred, two separate adhesives, which, when protective plastic strip 32 has been peeled off, allow the two sides to come together in a permanent adhered together configuration. By this means, the problems of the folds parting, such as shown in exaggerated form in FIGS. 2-4 are alleviated. Additionally shown in FIG. 5 are the objective lenses 14 and the eye piece lenses 12.

It is obvious that the three creases along one vertical side of the cup could be duplicated on the opposite side and still reach the desired goal of a straight oval cylinder.

In the preferred embodiment, a flexible plastic may be utilized as the cup material or, as is common, a heavy waxed paper may also be used. It will be necessary that the loops which were used in the alternate embodiment be supplied separately and be supplied having an adhesive along one small portion of the outside of the finger loop in order that it may be glued to the inside of the cylinder at the appropriate places. In the alternative, along with the finger loops, clips to hold the loops to the cup may be supplied.

While a preferred embodiment of the invention has been shown and described together with alternate embodiments, it will be understood that there is no intent to limit the invention by such disclosure, but rather it is intended to cover all modifications of the apparatus and alternate constructions falling within the spirit and scope of the invention as defined in the appended Claims.

I claim:

1. A novel drinking cup adaptable into binoculars comprising:
   a cylindrical cup having a bottom end with a removable closure, an open top end, and longitudinally extending cylindrical sides connecting said bottom and said top;
   a first opening formed in said cup cylindrical side;
   at least one ocular lens adapted to reside proximate said first opening formed in said cup cylindrical side;
   a second opening formed in said cup cylindrical side;
   an objective lens adapted to reside proximate said second opening formed in said cup cylindrical side, said objective lens positioned on said cup cylindrical side diametrically opposite said ocular lens whereby a person may view an object at a distance by looking at said object through said ocular lens and said objective lens, and said binocular may be focused by varying the distance between said ocular lens and said objective lens by deforming the cylindrical sides of said cylindrical cup.

2. The novel drinking cup adaptable to binoculars as defined in claim 1 wherein:
   said first opening in said cup cylindrical side defines a pair of spaced apart openings in said cup cylindrical side;
   said ocular lens proximate said first opening defines a pair of ocular lens proximate said pair of first openings;
   said second opening in said cup cylindrical side defines a pair of openings in said cup cylindrical side; and
   said objective lens positioned in said second opening defines a pair of objective lens proximate said pair of second openings.

3. The novel drinking cup adaptable into binoculars as defined in claim 2 wherein said pair of spaced apart first openings are spaced longitudinally in said cup cylindrical sides, and said pair of spaced apart second openings are also spaced longitudinally in said cup cylindrical sides.

4. The novel drinking cup adaptable into binoculars as defined in claim 3 wherein said longitudinally extending cylindrical sides define a truncated conical frustum with said closed bottom end having a first circumference and said open top end having a second circumference.

5. The novel drinking cup adaptable into binoculars as defined in claim 4 further including a first longitudinal crease formed in said cup cylindrical side, and a pair of diverging creases formed in said cup cylindrical side, said diverging creases formed with one crease on each side of said first crease, said diverging creases diverging from one end of the cup to the other, said cup cylindrical sides adapted to be folded along said creases to cause said diverging creases to join each other and thereby reduce the circumference of at least one end of the cylindrical cup.

6. The novel drinking cup adaptable into binoculars as defined in claim 5 wherein said closed bottom end first circumference is less than said open top end second circumference, and said diverging creases converge to intersect at said first crease at said closed bottom end, said diverging creases diverging longitudinally from said closed bottom end to said open top end.

7. The novel drinking cup adaptable into binoculars as defined in claim 6 wherein the greater arc between said diverging creases at said open top end is equal to the circumference of closed bottom end.

8. The novel drinking cup adaptable into binoculars as defined in claim 7 further including a second crease formed in said cup cylindrical side, said second crease situated opposite said first crease, said second crease adapted to be folded and released whereby when said diverging creases are brought together and said second crease folded and then released, an elongated cylinder of constant elliptical cross-section is formed in order that a person may view an object at a distance by looking at said object through said ocular lens and said objective lens, and said binoculars may be focused by varying the distance between said ocular lens and said objective lens by deforming the constant elliptical cross-section of said elongated cylinder.

9. The novel drinking cup adaptable into binoculars as defined in claim 8 further including at least one pair of finger loops adapted to be placed at opposite ends of said cup cylindrical sides interiorly to said cylinder, said finger loops adapted to receive fingers for varying the distance between said ocular lens and said objective lens to effect focusing of said binoculars.

10. The novel drinking cup adaptable into binoculars as defined in claim 9 further including a second pair of finger loops, said second pair of finger loops adapted to be placed in the ends of said cylinder opposite said first pair of finger loops, said first pair and second pair of finger loops each adapted to receive fingers to vary the distance between said ocular lens and said objective lens to effect focus of said binoculars.

11. The novel drinking cup adaptable into binoculars as defined in claim 5 further including an adhesive, said adhesive situated on said cup cylindrical sides between said diverging crease lines.

12. The novel drinking cup adaptable into binoculars as defined in claim 11 further including a plastic strip adapted to cover said adhesive, said plastic strip further adapted to be removed in order to join the cup cylindrical sides of the cup together between the diverging crease lines.

* * * * *